United States Patent [19]

Bement

[11] 3,842,485

[45] Oct. 22, 1974

[54] METHOD OF MAKING AN EXPLOSIVELY WELDED SCARF JOINT

[75] Inventor: Laurence J. Bement, Newport News, Va.

[73] Assignee: The United States of America as represented by the Administration of the National Aeronautics and Space Administration, Washington, D.C.

[22] Filed: Nov. 1, 1972

[21] Appl. No.: 302,681

[52] U.S. Cl................................. 29/470.1, 29/475
[51] Int. Cl............................................ B23k 21/00
[58] Field of Search....... 29/470.1, 475, 476, 421 E, 29/486, 497.5

[56] References Cited
UNITED STATES PATENTS

| 2,679,305 | 5/1954 | Gunthorp........................ 29/475 X |
| 2,701,483 | 2/1955 | Foxon et al..................... 29/470.1 |
| 2,703,998 | 3/1955 | Sowter............................ 29/475 X |
| 3,197,855 | 8/1965 | Carter et al..................... 29/470.1 |
| 3,263,323 | 8/1966 | Maher et al.................... 29/421 E X |
| 3,264,731 | 8/1966 | Chudzik.......................... 29/486 |
| 3,344,510 | 10/1967 | Kameishi et al.............. 29/470.1 |
| 3,364,562 | 1/1968 | Armstrong..................... 29/470.1 |
| 3,432,912 | 3/1969 | Doherty, Jr. et al............ 29/470.1 |
| 3,477,114 | 11/1969 | Kaufmann...................... 29/470.1 |
| 3,504,427 | 4/1970 | Seeloff........................... 29/476 X |

Primary Examiner—J. Spencer Overholser
Assistant Examiner—Ronald J. Shore
Attorney, Agent, or Firm—Howard J. Osborn; John R. Manning

[57] ABSTRACT

A method of obtaining a bond joint between thin metal members without the addition of a bonding agent. The method yields bond strengths comparable to the parent metal. It comprises overlapping the materials at the edges and bonding them by explosive welding while also making use of the explosive force to shape the materials into an essentially planar configuration.

10 Claims, 2 Drawing Figures

METHOD OF MAKING AN EXPLOSIVELY WELDED SCARF JOINT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to welding and more specifically to explosive welding of thin metal members.

The Welding Handbook, 5th Edition, Section 3-46.13 of the American Welding Society defines: joint, scarf, as a joint made by cutting away similar angular segments of two adherends and bonding the adherends with the cut areas fitted together. The Welding Handbook also states that such welds are difficult to aline and to prepare, particularly in thin members. It is obvious that considerable difficulty would be encountered in cutting a tapered edge onto a sheet of metal of one-eighth inch thickness or less. Moreover, to weld two such sheets together the complimentary tapers on the edges, the pieces must be fitted together and welded directly on the tapers in order to yield an end configuration approaching an integral coplanar surface. This fitting process becomes progressively more difficult as the thickness of the members decreases so that the scarf weld is not generally used for thin sheets.

SUMMARY OF THE INVENTION

This invention describes a method for producing a modified scarf weld which is not limited due to small gage of the parts to be welded. It uses the simple technique of explosive welding to bond and simultaneously shape sheet material so that an essentially planar finished part results in which the bond exhibits the strength of the parent metal. The method produces highly efficient, high-strength joints primarily because a larger bond area is created than in a conventional lap joint and because part of the bond area is placed in tension. No bonding material other than the members to be bonded is required for this technique. The use of explosive welding minimizes the equipment required thus allowing the technique to be used in remote locations such as space vehicles.

DETAILED DESCRIPTION OF THE INVENTION

Figure 1:
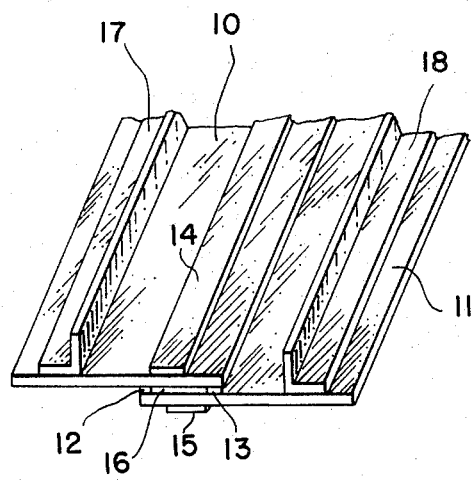
FIG. 1 shows a perspective view of the welding setup.

The particular embodiment of the invention selected for illustration is shown in the drawings. FIG. 1 details the technique of setup of the materials for an example in which lower member 11 is a metal sheet which is overlapped at one edge by upper member 10, another sheet metal member of equal thickness. The members 10 and 11 are placed with their surfaces and edges in parallel but are separated in the area of overlap by standoffs 12 and 13 of 0.015 inch thick aluminum. Each standoff is located adjacent and parallel to the edge of one of the overlapped members and they are separated laterally from each other by approximately one inch which is sufficient to prevent later interference with the bond. Explosive 15, preformed into a ribbon, is attached to the surface of lower member 11 opposite the bond area 16 by the use of strips of masking tape. Explosive 15 is slightly offset from the center axis of the bond area and explosive 14 is mounted in similar fashion on the top surface of upper member 10 but is offset in the opposite direction. Explosives 14 and 15 are thus mounted on opposite sides of the bond area 16 and offset relative to each other such that they overlap by approximately one half their widths.

Angle brace 17 is an addition to the configuration required only when the sheet material 10 lacks rigidity. Brace 17, which may also be formed of flat bar stock, is clamped as close as one inch from the explosives 14 and 15 to the sheet material 10 by conventional C clamps, or other means not shown, such that the longitudinal axis of brace 17 is parallel to the longitudinal axis of the bond area 16. Brace 17 thus prevents longitudinal buckling of the sheet material 10 due to variations in material rigidity or explosive pressure. A similar brace 18 may be used to give added rigidity to lower sheet member 11, if required.

Braces 17 and 18 may also be incorporated into conventional jigging methods to maintain the required orientation of sheet materials 10 and 11 prior to the bonding process. During the welding operation braces 17 and 18 are connected by angles, rods or other mechanical means thus allowing the shifting of sheet materials 10 and 11 as they are bonded. The jigging and support of the sheet materials must be accomplished in such a way as to leave clearance around the bond area of at least one foot in the directions transverse to the plates. This prevents the explosive force from being reflected from nearby surfaces and adversely affecting the bonding and shaping operations. One example of a method to accomplish such isolation is to use two work tables spaced apart with one workpiece and appropriate leveling materials clamped to each table and the bond area positioned at the midpoint of the space between the tables.

Figure 2:
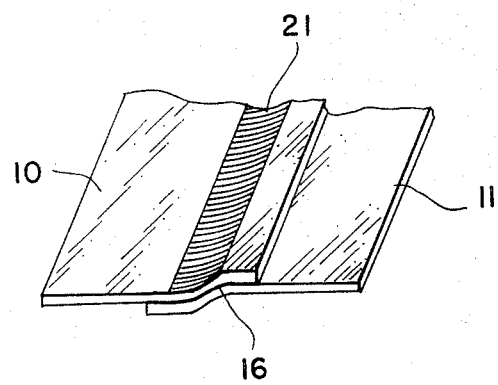
FIG. 2 shows a perspective view of the completed weld.

Explosives 14 and 15 are initiated simultaneously so that the explosive pressure produced causes the member 10 and 11 to accelerate and collide in area 16 where they overlap. This collision cleans the surface and metallurigically bonds the members together. In the area which the explosive ribbons do not overlap the explosive force bends each sheet metal member such that the end result yields an essentially planar surface as shown in FIG. 2. Area 16 is the resulting bonded area while shaded area 21 represents the indentation resulting from the explosive pressure.

Table 1 lists various embodiments of the explosively welded scarf joint. The "A" in 2024-T3A represents ALCLAD. The third column of the table shows the explosive quantity used to properly weld and shape the materials and thicknesses listed in columns 1 and 2, respectively. Columns 4 and 5 show the strength of the original sheet material and the strength of the resulting bond.

TABLE 1

| Material | Sheet thick inch | Explosive quantity grains/ft | Material strength pounds/in. | Joint strength pounds/in. |
| --- | --- | --- | --- | --- |
| Aluminum | | | | |
| 2024-T3A | 0.040 | 7 | 2300 | 2490 |
| 2024-T3A | 0.063 | 15 | 4300 | 3920 |
| 2024-T3A | 0.090 | 20 | 6100 | 5290 |
| 6061-T6 | 0.063 | 15 | 3000 | 2880 |
| 6061-T6 | 0.090 | 20 | 4300 | 3830 |
| Titanium | | | | |
| 6A1-4V | 0.056 | 25 | 7320 | 7320 |

It is to be understood that the forms of the invention herewith shown and described are to be taken as preferred embodiments. Various changes may be made in the shape and size of materials and in the placement of the parts. For example, while the specific embodiments described all include equal material thickness, proper selection of explosive quantity for each of the explosive ribbons allows the welding of unequal gage sheets.

Also, while 0.015 inch aluminum shims are described as the standoff for the explosive welding process, neither the material nor the exact spacing is critical. The material should be strong enough to allow removal after welding by pulling from one end. The thickness of the standoff is essentially limited to the thickness of the sheet material to be welded since too great a separation will cause the sheet material to fracture when bending. Moreover, the relative alinements of the plates to be welded may vary, and in such cases the specific location of the explosive for the welding process would also vary accordingly.

What is claimed as new and desired to be secured by Letters Patent of the United States is:

1. A method of joining metal members in a scarf joint with minimum edge overlap without attendant difficulty in shaping, alinement and preparation of the part which consist of:
   providing two members to be joined;
   placing said members so that each has one surface overlapping a surface of the other member at the area to be bonded;
   applying directed forces from opposite sides of said overlapped members in the area of overlap;
   partially offsetting said directed forces to cause a portion but not all of each force to counteract the other;
   thereby bonding the members together metallurgically while bending the two overlapping members to form the major portions of the members into one plane.

2. A method of welding a scarf joint as in claim 1 wherein the directed forces are created by placing explosives on opposite sides of the proposed bond.

3. A method of welding a scarf joint as in claim 1 wherein the directed forces are applied by placing explosives on opposite sides of the proposed bond area and separating the metal members from each other by spacing up to the order of magnitude of the thickness of the members to be bonded, said spacing thereby allowing for the bending of the materials without fracture such that the major portions of the members form a single plane.

4. A method of explosively welding a scarf joint as in claim 2 wherein the explosive is lead-sheathed linear ribbon explosive.

5. A method of explosively welding a scarf joint as in claim 2 wherein the materials welded are of equal thickness; and the explosive material on either side of the joint are of equal explosive loading.

6. A method of explosively welding a scarf joint as in claim 2 wherein the materials welded are of unequal thickness and the explosive material on either side of the joint is adjusted to compensate for different material thickness.

7. A method of explosively welding a scarf joint as in claim 3 wherein the sheet materials are 0.020 to 0.040 inch thick aluminum alloy; the spacers are 0.015 inch thick aluminum shims; and the explosive charges are ribbon explosive of 7 grains per foot loading.

8. A method of explosively welding a scarf joint as in claim 3 wherein the sheet materials are 0.050 to 0.070 inch thick aluminum alloy; the spacers are 0.015 inch thick aluminum shims; and the explosive charges are ribbon explosive of 15 grains per foot loading.

9. A method of explosively welding a scarf joint as in claim 3 wherein the sheet materials are 0.080 to 0.090 inch thick aluminum alloy; the spacers are 0.015 inch thick aluminum shims; and the explosive charges are ribbon explosive of 20 grains per foot loading.

10. A method of explosively welding a scarf joint as in claim 3 wherein the sheet materials are 0.050 to 0.060 inch thick titanium alloy; the spacers are 0.015 inch thick aluminum shims; and the explosive charges are ribbon explosive of 25 grains per foot loading.

* * * * *